Patented Aug. 23, 1938

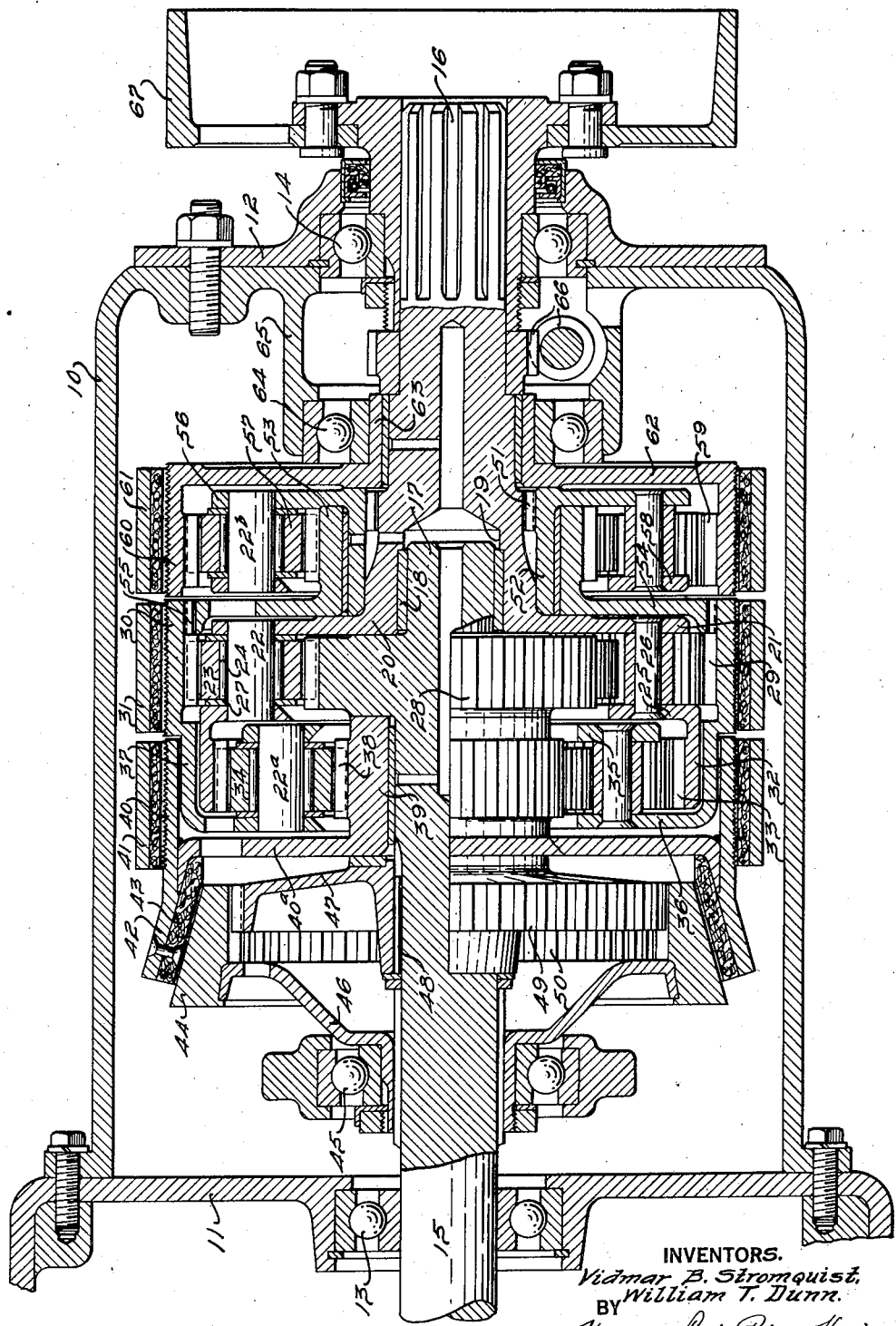

2,127,655

UNITED STATES PATENT OFFICE

2,127,655

PLANETARY TRANSMISSION

Vidmar B. Stromquist, Farmington, and William T. Dunn, Detroit, Mich., assignors to Chrysler Corporation, Highland Park, Mich., a corporation of Delaware Application April 19, 1935, Serial No. 17,158

14 Claims. (Cl. 74—268)

This invention relates to power transmissions and refers more particularly to speed ratio changing devices adapted for use in motor vehicle drives.

Our invention has among its objects the provision of an improved power transmission of the planetary gear type; a transmission having a plurality of speed ratio drives including low, second, third or direct, and reverse, and which embodies improvements in simplification of parts, durability and low manufacturing cost.

Further objects of our invention are to provide an improved planetary gear transmission comprising a single driving sun gear for effecting the speed ratio drives; a planetary transmission which offers better opportunity for providing the desired speed ratio values with relatively smaller gear sizes and over-all transmission size than has heretofore been obtained; a transmission providing a relatively faster second speed ratio for a given size of gears and a reduction in pinion speeds, especially when idling.

Further objects and advantages of our invention will be more apparent from the following detail description of one illustrative embodiment thereof, reference being had to the accompanying drawing in which the single figure represents a sectional elevational view longitudinally through our transmission.

In the drawing, reference character 10 indicates the main casing for housing the working parts, the casing front and rear wall structures 11 and 12 respectively providing the anti-friction bearings 13, 14 for journalling the driving and driven shafts 15, 16 respectively.

The driving shaft 15 has a forward end 17 journalled by a bushing 18 in the forwardly opening bore 19 of the driven shaft 16, the forward end 20 of the driven shaft thus piloting the rear end of the driving shaft. For convenience of reference, the driving shaft 15 may be referred to as having forward rotation, viz., clockwise when viewed from the front of the transmission. The shaft end 20 terminates forwardly in the radially flanged carrier 21 for the axles 22 of the first or low speed planetary gears 23. According to generally customary practice, each planetary gear train includes a plurality of spaced planetary gears preferably three in number, one of the gears 23 of the low speed train being shown in the drawing.

The axle 22 preferably journals its gear 23 by the antifriction rollers 24, the companion carrier 25 being secured to carrier 21 at circumferentially spaced intervals by the rivets 26 which mount the axles 22. Certain of the axles 22, between adjacent gears 23, may serve merely as spacers for the carriers 21 and 25, as illustrated at the bottom portion of the carriers. Bushings or washers 27 are located at opposite sides of each gear 23.

The gears 23 mesh with the primary driving sun gear 28, preferably formed as a part of shaft 15, and also with the internal gear annulus 29 carried by the low speed drum 30 which is adapted for engagement by a brake 31. This brake 31 is adapted to hold drum 30 against rotation in a backward direction opposite to the forward direction of rotation of shaft 15 and thereby provide the necessary reaction for obtaining the low speed drive as will be presently more apparent.

The carrier 25 has a forward cylindrical flange 32 formed with internal gear 33 meshing with planetary gears 34 of the second speed train. The axles 22ᵃ mounting gears 34 are mounted between a rear carrier 35 and a forward carrier 36, the latter having a cylindrical flange 37 closely surrounding flange 32 and forming an extension of drum 30.

Gears 34 also engage the second speed sun gear 38 fixed to the hub 39 of the radial flange 40ᵃ which in turn has secured thereto the second speed drum 40 closely surrounding flange 37. The drum 40 is adapted for engagement by a second speed brake 41. The brake 41 is adapted to prevent backward rotation of drum 40 and sun gear 38 to provide the reaction for the second speed drive.

The drum 40 has a forward extension 42 providing the direct speed drum preferably in the form of a friction cone 43 adapted for engagement by the companion cone 44 which is slidable on shaft 15 through the hub 46. The hub 46 may be moved axially of shaft 15 by any suitable manually actuated shifting device (not shown) connected to the ring shown as surrounding the thrust bearing 45. The cone 44 is drivingly connected to shaft 15 by reason of the hub 47 keyed at 48 to said shaft and having outer teeth 49 drivingly and slidably engaging internal teeth 50 carried by cone 44.

For obtaining a reverse drive, the shaft 16 has a toothed engagement at 51 with a sleeve 52 mounted on the shaft end 20, this sleeve journalling the sun gear 53 having the forward radial flange 54 drivingly connected to drum 30, as by the toothed connection 55. The sleeve 52 has a rear radial flange 56 providing a carrier for the hubs 22ᵇ of the planetary gears 57, the forward carrier comprising a ring 58.

The gears 57 mesh with sun gear 53 and also with internal gear 59 of the reverse drum 60 adapted for engagement by brake 61. Drum 60 has a rear flange 62 extending inwardly to its hub 63 journalled between shaft 16 and bearing 64 carried by casing flange 65. The usual speedometer drive gears are illustrated at 66 and shaft 16 may, if desired, carry a brake drum 67.

It will be noted that the parts are closely nested together against displacement especially axially. Any well known means may be provided for selectively operating brakes 31, 41, 61 and cone 44 for controlling the drive, such means not being illustrated as it is well known. Normally, as illustrated, the brakes have clearance with their associated drums. For obtaining a drive in low gear, brake 31 is actuated to arrest rotation of drum 30, all other brakes being free together with cone 44. Similarly, for second speed, brake 41 grips drum 40; for direct speed, cone 44 is moved to engage drum 42; for reverse, brake 61 grips drum 60. Only one of the brakes or cone 44 is actuated at a time into gripping engagement with its associated drum, all other parts of the mechanism running freely.

When brake 31 is actuated for low gear drive, such drive is obtained by sun gear 28 operating planet gears 23 about their axes, the internal gear 29 being fixed and carrier 21 revolving in the direction of drive shaft 15 but at much slower speed.

When second speed is desired, brake 41 acts to hold drum 40 and sun 38 fixed, the driving sun gear 28 acting on planetary gears 23 to drive shaft 16 by reason of the interconnection provided between carrier 36 and internal gear 29 and between carrier 25 and internal gear 33, the drum 30 being freely rotatable.

When cone 44 engages the cone 42 to obtain direct drive, the sun gears 28 and 38 are both driven at the speed of shaft 15 causing the first and second speed gear trains to rotate as a unit with shaft 15. The driven shaft 16 is thus directly connected to shaft 15 through the carrier 21.

For reversing the drive, brake 61 engages drum 60, the sun gear 28 transmitting the drive through the reverse gear train, it being noted that planet gear carrier 56 is fixed to the driven shaft 16 while the freely rotatable drum 30 is connected to sun gear 53. The internal gear 59 being held, produces the reverse speed ratio drive between the shafts.

It will be understood that such terms as "low", "second", "third or high" as applied to the speed ratios are used in a relative sense in order to indicate progressions in speed ratio values.

We claim:

1. In a planetary gear transmission, a driving shaft, a driven shaft coaxially arranged with respect to said driving shaft, a primary sun gear carried by said driving shaft, low speed planetary gears driven by said primary sun gear, a low speed annulus driven by said low speed planetary gears, a low speed carrier for said low speed planetary gears directly drivingly connected with said driven shaft for rotation at the same speed therewith, braking means adapted to arrest rotation of said low speed annulus for causing said primary sun gear to drive said driven shaft at low speed, a second speed sun gear coaxial with said driving shaft and rotatable independently thereof, a second speed annulus directly drivingly connected to said low speed carrier, second speed planetary gears drivingly engaged with said second speed sun gear and second speed annulus, a second speed carrier for said second speed planetary gears directly drivingly connected to said low speed annulus, and braking means adapted to arrest rotation of said second speed sun gear with said low speed annulus released from its said braking means for causing said primary sun gear to drive said driven shaft in second speed.

2. In a planetary gear transmission, a driving shaft, a driven shaft coaxially arranged with respect to said driving shaft, a primary sun gear carried by said driving shaft, low speed planetary gears driven by said primary sun gear, a low speed annulus driven by said low speed planetary gears, a low speed carrier for said low speed planetary gears directly drivingly connected with said driven shaft for rotation at the same speed therewith, braking means adapted to arrest rotation of said low speed annulus for causing said primary sun gear to drive said driven shaft at low speed, a second speed sun gear coaxial with said driving shaft and rotatable independently thereof, a second speed annulus directly drivingly connected to said low speed carrier, second speed planetary gears drivingly engaged with said second speed sun gear and second speed annulus, a second speed carrier for said second speed planetary gears directly drivingly connected to said low speed annulus, braking means adapted to arrest rotation of said second speed sun gear with said low speed annulus released from its said braking means for causing said primary sun gear to drive said driven shaft in second speed, and direct drive clutching means for directly drivingly connecting said driving shaft with said second speed sun gear, with said low speed annulus and said second speed sun gear released from their respective braking means aforesaid, for causing said driving shaft to directly drive said driven shaft.

3. In a planetary gear transmission, a driving shaft, a driven shaft coaxially arranged with respect to said driving shaft, a primary sun gear carried by said driving shaft, low speed planetary gears driven by said primary sun gear, a low speed annulus driven by said low speed planetary gears, a low speed carrier for said low speed planetary gears directly drivingly connected with said driven shaft for rotation at the same speed therewith, braking means adapted to arrest rotation of said low speed annulus for causing said primary sun gear to drive said driven shaft at low speed, a second speed sun gear coaxial with said driving shaft and rotatable independently thereof, a second speed annulus directly drivingly connected to said low speed carrier, second speed planetary gears drivingly engaged with said second speed sun gear and second speed annulus, a second speed carrier for said second speed planetary gears directly drivingly connected to said low speed annulus, and braking means adapted to arrest rotation of said second speed sun gear with said low speed annulus released from its said braking means for causing said primary sun gear to drive said driven shaft in second speed, a reverse speed sun gear coaxial with said driven shaft and rotatable independently thereof, a reverse speed annulus, reverse speed planetary gears drivingly engaged with said reverse speed sun gear and reverse speed annulus, means directly drivingly connecting said low speed annulus with said reverse speed sun gear, a reverse speed carrier for said reverse speed planetary gears directly drivingly connected to said driven shaft, and braking means adapted to arrest rotation of said reverse speed annulus, with said low speed annulus and said second speed sun gear released from their respective braking means aforesaid, for causing said primary sun gear to drive said driven shaft in reverse.

4. In a planetary gear transmission, a driving shaft, a driven shaft coaxially arranged with respect to said driving shaft, a primary sun gear carried by said driving shaft, low speed planetary gears driven by said primary sun gear, a low speed annulus driven by said low speed planetary gears, a low speed carrier for said low speed planetary gears directly drivingly connected with said driven shaft for rotation at the same speed therewith, braking means adapted to arrest rotation of said low speed annulus for causing said primary sun gear to drive said driven shaft at low speed, a second speed sun gear coaxial with said driving shaft and rotatable independently thereof, a second speed annulus directly drivingly connected to said low speed carrier, second speed planetary gears drivingly engaged with said second speed sun gear and second speed annulus, a second speed carrier for said second speed planetary gears directly drivingly connected to said low speed annulus, braking means adapted to arrest rotation of said second speed sun gear with said low speed annulus released from its said braking means for causing said primary sun gear to drive said driven shaft in second speed, and direct drive clutching means for directly drivingly connecting said driving shaft with said second speed sun gear, with said low speed annulus and said second speed sun gear released from their respective braking means aforesaid, for causing said driving shaft to directly drive said driven shaft, a reverse speed sun gear coaxial with said driven shaft and rotatable independently thereof, a reverse speed annulus, reverse speed planetary gears drivingly engaged with said reverse speed sun gear and reverse speed annulus, means directly drivingly connecting said low speed annulus with said reverse speed sun gear, a reverse speed carrier for said reverse speed planetary gears directly drivingly connected to said driven shaft, and braking means adapted to arrest rotation of said reverse speed annulus, with said low speed annulus, second speed sun gear and direct speed braking and clutching means respectively released, for causing said primary sun gear to drive said driven shaft in reverse.

5. In a planetary gear transmission, a driving shaft, a driven shaft coaxially arranged with respect to said driving shaft, a low speed planetary gear set comprising a primary sun gear carried by said driving shaft, low speed planetary gears driven by said primary sun gear, a low speed annulus driven by said low speed planetary gears, a low speed carrier for said low speed planetary gears directly drivingly connected with said driven shaft for rotation at the same speed therewith; braking means adapted to arrest rotation of said low speed annulus for causing said primary sun gear to drive said driven shaft at low speed, a reverse speed sun gear coaxial with said driven shaft and rotatable independently thereof, a reverse speed annulus, reverse speed planetary gears drivingly engaged with said reverse speed sun gear and reverse speed annulus, means directly drivingly connecting said low speed annulus with said reverse speed sun gear, a reverse speed carrier for said reverse speed planetary gears directly drivingly connected to said driven shaft, braking means adapted to arrest rotation of said reverse speed annulus, with said low speed annulus released from its said braking means, for causing said primary sun gear to drive said driven shaft in reverse, and an additional planetary gear set operably connected to said low speed planetary gear set, control means for said additional gear set, said additional gear set being so constructed and arranged as to drive said driven shaft forwardly from the primary sun gear of said low speed gear set by compounding said low speed gear set with said additional gear set.

6. In a planetary gear transmission, a driving shaft, a driven shaft, a plurality of forwardly driving planetary gear trains for drivingly connecting said shafts, a single driving sun gear carried by said driving shaft for selectively transmitting a plurality of forward drives to said driven shaft through said gear trains, means for directly drivingly connecting said shafts including a driving clutch member, a hub connected to said driving shaft and having a sliding driving connection with said driving clutch member, means including a thrust member slidable on said driving shaft independently of said hub for moving said driving clutch member, and a driven clutch member engageable with said driving clutch member, said driven clutch member being drivingly connected to one of said planetary gear trains.

7. In a planetary transmission having a driving shaft, a plurality of groups of forwardly driving planetary gear sets operatively associated with said driving shaft, a driven shaft in operable connection with the first group of gears, means for driving said driven shaft at one forward reduction speed from the sun gear of the first group of gears by locking the annulus of the first gear group, means whereby another forward reduction drive resulting from the compounding of the first and second gear groups is obtained by locking the sun of the second group of gears, the planet gear carrier of said first gear group being directly drivingly connected with said driven shaft, and a reverse planetary gear set mounted on said driven shaft and having the planet gear carrier thereof fixed with said driven shaft and the sun thereof fixed with the annulus of the first gear group.

8. In a planetary transmission having a driving shaft, a plurality of groups of forwardly driving planetary gear sets operatively associated with said driving shaft, a driven shaft in operable connection with the first group of gears, means for driving said driven shaft at one forward reduction speed from the sun gear of the first group of gears by locking the annulus of the first gear group, means whereby another forward reduction drive resulting from the compounding of the first and second gear groups is obtained by locking the sun of the second group of gears, the planet gear carrier of said first gear group being directly drivingly connected with said driven shaft, and means for locking the sun gear of said second gear group with said driving shaft to provide a direct drive between said shafts.

9. In a planetary transmission having driving and driven shafts, a plurality of planetary gear trains adapted to selectively transmit low and intermediate forward speed reduction drives from the drive shaft to the driven shaft, a reversing planetary gear train adapted to connect said shafts for a reverse drive from the drive shaft to the driven shaft, said low speed gear train including a sun gear driven from the drive shaft and a planet pinion carrier connected to the driven shaft and further including an annulus gear, said reversing gear train including a sun gear connected to rotate with said annulus gear and a planet pinion carrier connected to said driven shaft, said intermediate speed gear train including a planet pinion carrier also connected to rotate with said annulus gear and a sun gear disposed for rotation relative to said drive shaft.

10. In a planetary gear transmission, driving and driven coaxially arranged shafts, a plurality of planetary gear trains adapted to selectively transmit forward reduction drives between said shafts, a reversing planetary gear train intermediate said shafts, a single sun gear directly drivingly connected to said driving shaft and operably connected with each of said gear trains, a planet pinion meshing with said sun gear, and a carrier for said pinion directly drivingly connected with said driven shaft during said forward and reverse drives, said reversing gear train having an element thereof connected to said driven shaft.

11. In a planetary gear transmission, driving and driven coaxially arranged shafts, a plurality of planetary gear trains adapted to selectively transmit forward reduction drives between said shafts, a reversing planetary gear train intermediate said shafts, a single sun gear directly drivingly connected to said driving shaft and operably connected with each of said gear trains, a plurality of coaxial control drums for said gear trains, said drums having substantially equal diameters and being arranged to house said gear trains, a planet pinion meshing with said sun gear, and a carrier for said pinion directly drivingly connected with said driven shaft during said forward and reverse drives, said reversing gear train having an element thereof connected to said driven shaft.

12. In a planetary transmission having a driving shaft, a plurality of groups of forwardly driving planetary gear sets operably associated with said driving shaft, a driven shaft in operable connection with the first group of gears, means for driving said driven shaft at one forward reduction speed from the sun gear of the first group of gears by locking the annulus of the first gear group, means whereby another forward reduction drive resulting from the compounding of the first and second gear groups is obtained by locking the sun of the second group of gears, the planet gear carrier of said first gear group being directly drivingly connected with said driven shaft, and a reverse drive planetary gear set including a sun gear element and a planet pinion element meshed therewith, said reverse gear set also including a carrier element for said planet pinion element, one of said elements of said reverse gear set having continuous drive connection with said driven shaft during said forward and reverse drives.

13. In a planetary gear transmission; a forwardly rotatable driving shaft; a driven shaft coaxial with the driving shaft; planetary reduction gearing for driving the driven shaft from the driving shaft in a forward direction of rotation and at a slower speed, comprising, a sun gear element driven directly from the driving shaft, a planet gear element meshing with said sun gear element, a carrier element for said planet gear element directly drivingly connected with the driven shaft, an annulus gear element meshing with said planet gear element, means operable to prevent backward rotation of said annulus gear element thereby to effect said drive through said planetary reduction gearing; additional planetary reduction gearing for driving the driven shaft from the driving shaft in a forward direction of rotation by compounding with the first said planetary reduction gearing to effect a drive faster than that aforesaid, said additional planetary reduction gearing comprising, a sun gear member, a planet gear member meshing with said sun gear member, a carrier member for said planet gear member directly drivingly connected with said annulus gear element, an annulus gear member meshing with said planet gear member and directly drivingly connected with said carrier element, and means operable to prevent backward rotation of said sun gear member thereby to effect said faster drive.

14. In a planetary gear transmission; a forwardly rotatable driving shaft; a driven shaft coaxial with the driving shaft; planetary reduction gearing for driving the driven shaft from the driving shaft in a forward direction of rotation and at a slower speed, comprising, a sun gear element driven directly from the driving shaft, a carrier element directly drivingly connected with the driven shaft, a planet gear element carried by said carrier element and meshing with said sun gear element; an annulus gear element meshing with said planet gear element, means operable to prevent backward rotation of said annulus gear element thereby to effect said drive through said planetary reduction gearing; additional planetary reduction gearing for driving the driven shaft from the driving shaft in a forward direction of rotation by compounding with the first said planetary reduction gearing to effect a drive faster than that aforesaid, said additional planetary reduction gearing comprising, a sun gear member, a planet gear member meshing with said sun gear member, a carrier member for said planet gear member directly drivingly connected with said annulus gear element, an annulus gear member meshing with said planet gear member and directly drivingly connected with one of the first two said elements of the first said planetary reduction gearing, and means operable to prevent backward rotation of said sun gear member thereby to effect said faster drive.

VIDMAR B. STROMQUIST.
WILLIAM T. DUNN.